United States Patent [19]

Man-El

[11] 4,244,374
[45] Jan. 13, 1981

[54] FOCUSSING SOLAR COLLECTOR

[76] Inventor: Daniel Man-El, 90 Frishman St., Tel Aviv, Israel

[21] Appl. No.: 908,282

[22] Filed: May 22, 1978

[51] Int. Cl.³ .............................................. F24J 3/02
[52] U.S. Cl. .................................... 126/438; 126/446
[58] Field of Search ............... 126/270, 271, 438, 448, 126/446, 417; 237/1 A; 350/293; 136/89 PC

[56] References Cited

U.S. PATENT DOCUMENTS

| | | | |
|---|---|---|---|
| 3,321,012 | 5/1967 | Hervey | 126/437 |
| 4,011,855 | 3/1977 | Eshelman | 126/271 |
| 4,091,796 | 5/1978 | Bieringer et al. | 126/271 |
| 4,099,516 | 7/1978 | Caulier | 126/271 |
| 4,121,566 | 10/1978 | Radenkovic | 126/271 |
| 4,175,540 | 11/1979 | Roantree et al. | 126/438 |

Primary Examiner—James C. Yeung
Assistant Examiner—Larry Jones
Attorney, Agent, or Firm—Benjamin J. Barish

[57] ABSTRACT

A focussing solar collector is described including a solar-radiation reflector and a solar-radiation absorber disposed to receive the solar-radiations directly and those reflected from the reflector, characterized in that the reflector is of a cylindrical configuration having a semi-circular cross-section of constant radius of curvature, and that the absorber is of flattened cross-section having a height of from 0.1 to 0.5 times the radius of curvature of the reflector and a width substantially less than its height, the absorber being disposed within the reflector with one end of the absorber at the mid-point of the reflector inner surface and with the height axis of the absorber aligned with the reflector radius from said mid-point. In the described preferred embodiment, the absorber is a flattened pipe for conducting therethrough a heat-transfer fluid medium to be heated by the solar radiation, the flattened pipe having a height:width ratio in the range of 2.5:1 to 3.5:1.

4 Claims, 10 Drawing Figures

U.S. Patent  Jan. 13, 1981  Sheet 1 of 2  4,244,374
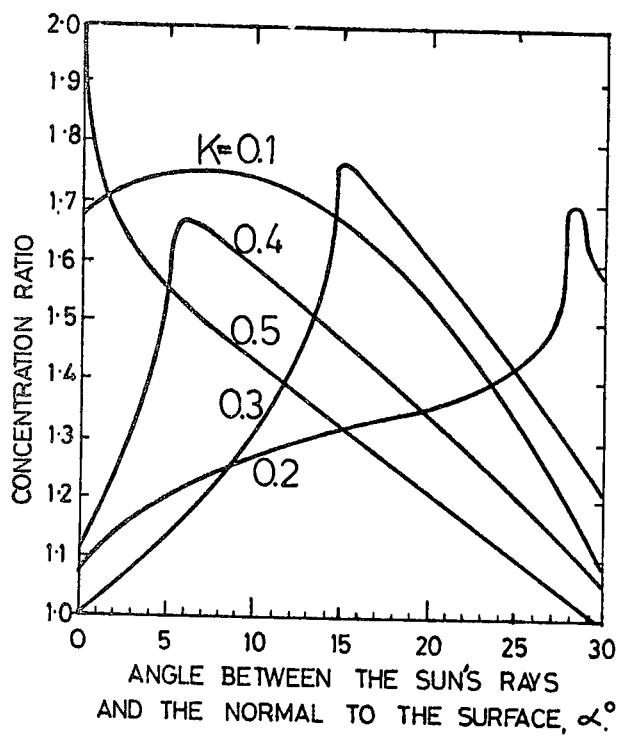
FIG. 7
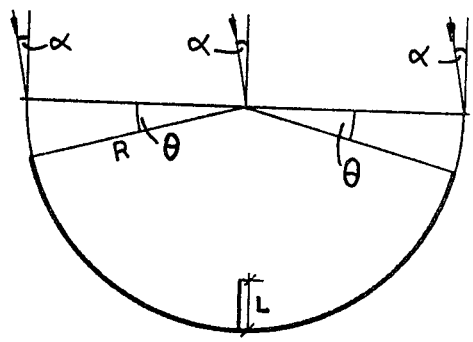
FIG. 1
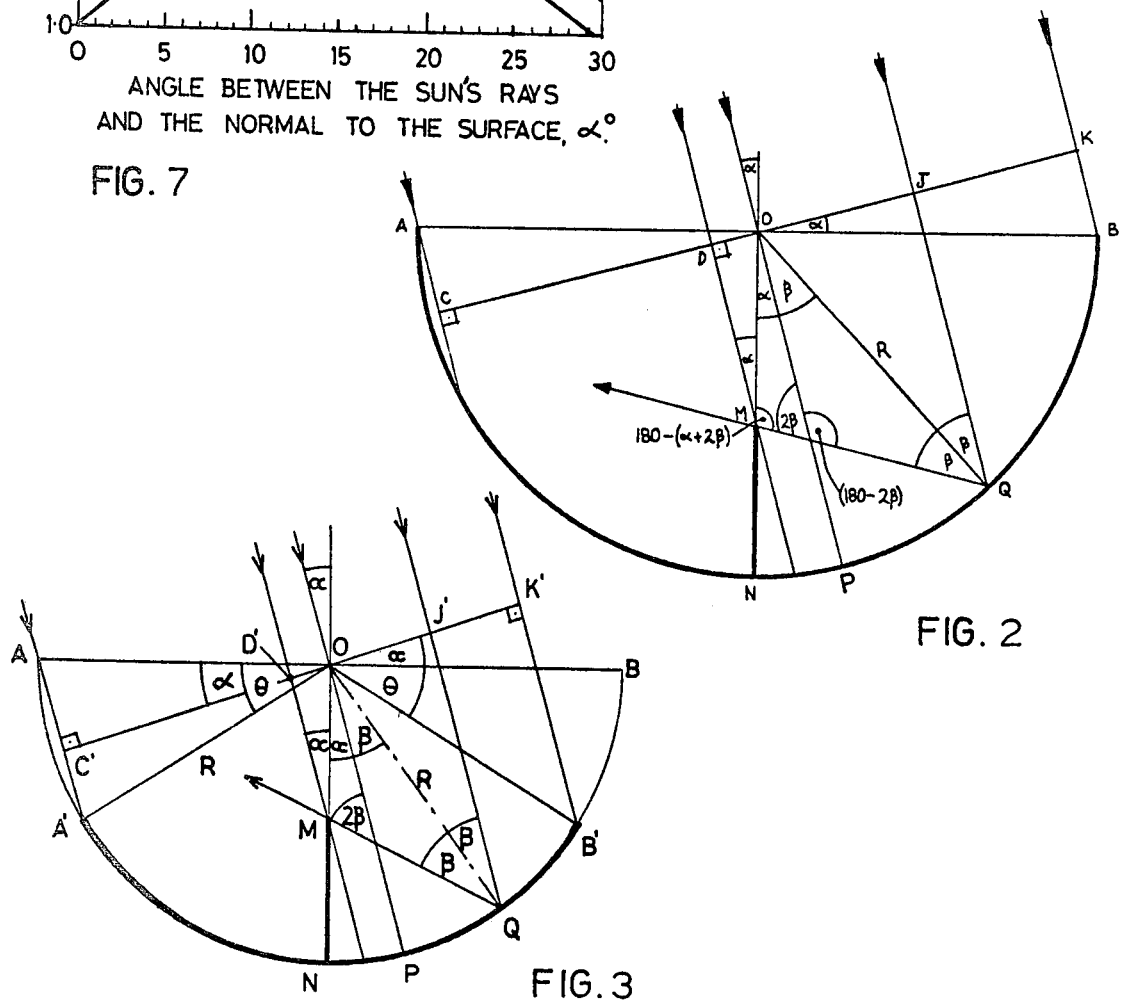
FIG. 2
FIG. 3

SECTION A-A

FOCUSSING SOLAR COLLECTOR

BACKGROUND OF THE INVENTION

The present invention relates to focussing solar collectors, and particularly to those including a solar-radiation reflector and a solar-radiation absorber disposed to receive the solar radiations directly and from the reflector. The invention is particularly useful with respect to solar collectors wherein the absorber is a conduit for a fluid, i.e., a liquid or gas, heat-transfer medium to be heated by the solar radiations, and the invention is therefore described below particularly with respect to this application.

A large number of focussing solar collectors of the above type have been developed of many various configurations. However, efforts are continuously being made to increase the efficiency and to reduce the cost of such collectors, since both of these factors greatly influence the economic feasibility of using collectors in many different applications.

An important factor contributing to the efficiency of a solar collector is its "Concentration Ratio" (C.R.), i.e., the ratio of area of intercepted solar radiations to area of the absorber. It will be appreciated that the area of interception of solar radiations will be at a maximum when the radiation impinges the absorber surface exactly at a right angle, i.e., at an 0° angle of incidence to the normal to the collector surface. However, as a result of the Earth's rotation around the sun, the angle between the sun's rays and the normal to the collector will vary, and therefore for each latitude there is a symmetrical and optimal tilt of the collector. The symmetrical placement is fixed for each different latitude, while the optimal tilt depends on the use of the collector, e.g. for heating or cooling. For stationary concentrating collectors used for cooling, the angle will be such as to have a greater C.R. during summer, and those used for heating will have a greater C.R. during winter. For example, a horizontally tilted collector at the equator is considered symmetrically tilted because the time intervals between the days when the sun is in equinoctial path (and in this particular case the zenith as well) are equal.

SUMMARY OF THE INVENTION

According to a broad aspect of the present invention, there is provided a focussing solar collector including a solar-radiation reflector and a solar-radiation absorber disposed to receive the solar-radiations directly and those reflected from the reflector, characterized in that said reflector is of cylindrical configuration having a semi-circular cross-section and a constant radius of curvature, and that said absorber is of flattened cross-section having a height of from 0.1 to 0.5 times the radius of curvature of the reflector and a width substantially less than its height, said absorber being disposed within the reflector with one end of the absorber at the mid-point of the reflector inner surface and with the height axis of the absorber aligned with the reflector radius from said mid-point.

In the preferred embodiment of the invention described below, the absorber is a flattened pipe for conducting therethrough a heat-transfer fluid medium to be heated by the solar radiations, said flattened pipe having a height:width ratio in the range of 2.5:1 to 3.5:1.

The foregoing features enable the construction of the solar collectors of high efficiency and of simple, and therefore low-cost, design. To make this more readily apparent, the description below contains a general equation which I have developed for determining the concentration ratio (C.R.) of such solar collectors under all possible situations including different declinations of the sun.

BRIEF DESCRIPTION OF THE DRAWINGS

The invention is herein described, somewhat diagrammatically and by way of example only, with reference to the accompanying drawings, wherein:

FIGS. 1–7 are diagrams helpful in explaining the development of the above-mentioned general equation for determining the concentration ratio (C.R.) of a focussing solar collector according to the present invention;

DESCRIPTION OF THE PREFERRED EMBODIMENT

Figure 8:
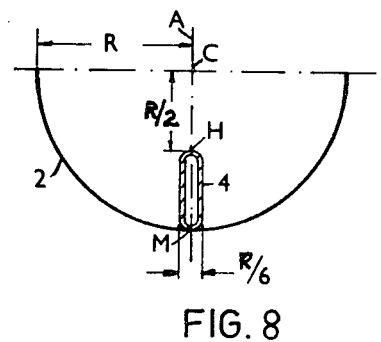
FIG. 8 is a transverse sectional view illustrating a preferred simple form of focussing solar collector constructed in accordance with the invention.
Figure 9:
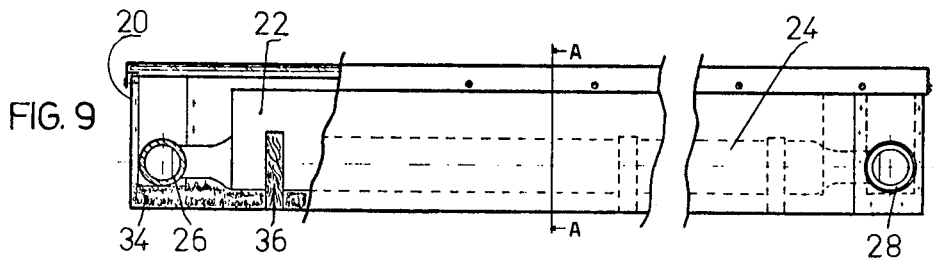
FIG. 9 is a longitudinal sectional view of a plural-collector unit constructed in accordance with the invention.
Figure 10:
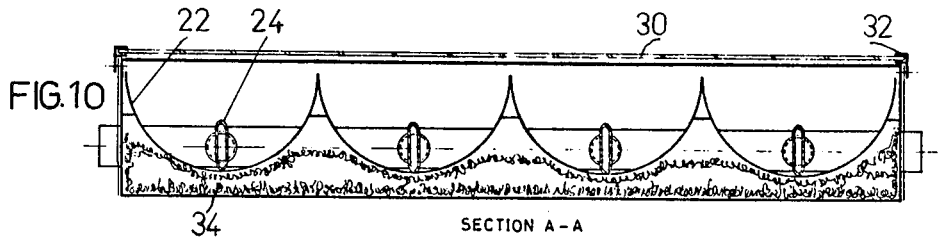
FIG. 10 is a transverse sectional view of the solar collector of FIG. 9.

Before proceeding with a description of the solar collector construction illustrated in FIGS. 8–10, it is believed that it would be helpful to first describe the development of the general equation mentioned above for determining the concentration ratio (C.R.) of focussing solar collectors including reflectors of cylindrical configuration having a semi-circular cross-section and a flattened absorber. In the development of this general equation, the following assumptions are made:

(1) the absorber is treated as a very thin plate; and (2) the reflector is considered to be an ideal one.

FIG. 1 illustrates the three major variables on which the concentration ratio (C.R.) largely depends namely:

(1) $\alpha$—defines the angle between the sun's rays and the axis of the collector.

(2) K—defines the absorber radius ratio (K=L/R, $0<L<R/2$).

(3) $\theta$—defines the arc of a non-reflecting section.

Assume the case where $\alpha=0$, $\theta=0$ and K=0.5.

It is well known that all paraxial rays reflected off a spherical or cylindrical mirror cross the axis 'inside' the focal point. In that particular case $$C.R. = \frac{2R}{2(R/2)} = 2 \quad (1)$$

Let us go one step further and say that $\alpha$ varies from 0° to 30°, $\theta=0$ and K=0.5; this is shown in FIG. 2.

For this combination the concentration ratio (C.R.) is derived as follows:

collector frontal area $= \overline{AOB} = 2R$ collector projected area $= \overline{COK} = 2R \cos \alpha$ $\qquad = \overline{CD} + \overline{DO} + \overline{OK}$ absorber area (both sides) $= 2KR = 2(0.5) R = R$ Energy passing through $\overline{DO}$ and $\overline{OJ}$ is not intercepted by the absorber.

Therefore concentration ratio $= \dfrac{\overline{CD} + \overline{JK}}{R}$ (2)

Now $\overline{CD} = \overline{CO} - \overline{DO} = R \cos\alpha - (R/2) \sin\alpha$ and $\overline{JK} = \overline{OK} - \overline{OJ} = R \cos\alpha - R \sin\beta$ ∴ C.R. $= 2 \cos\alpha - (0.5) \sin\alpha - \sin\beta$ The angle $\beta$ is given in terms of $\alpha$ from the triangle OMQ:

$$\dfrac{R}{\sin(\alpha + 2\beta)} = \dfrac{R/2}{\sin\beta}$$

This equation must be solved numerically. The resulting concentration ratio is shown in FIG. 7 (the 0.5 line) as a function of $\alpha$.

The next step is to let $\theta$ and $\alpha$ to vary and keep K=0.5; this is shown in FIG. 3.

The effective collector width (E.C.W.) for $\overline{OA}'$ will be $R \cos(\theta - \alpha) - (0.5) R \sin(\alpha)[\overline{OC}' - \overline{OD}']$.

As for $\overline{OB}'$ the E.C.W. will be $\overline{OK}' - \overline{OJ}'$ that is $R \cos(\alpha + \theta) - R \sin(\beta)$.

The expression for $\overline{OB}'$ is valid only when $\alpha < 90 - \theta$ otherwise no rays will hit the reflector.

For these conditions the C.R. becomes:

$$C.R. = \dfrac{R \cos(\alpha - \theta) - (0.5) R \sin(\alpha) + R \cos(\alpha + \theta) - R \sin(\beta)}{2(R/2)} \quad (3)$$

Figure 4:
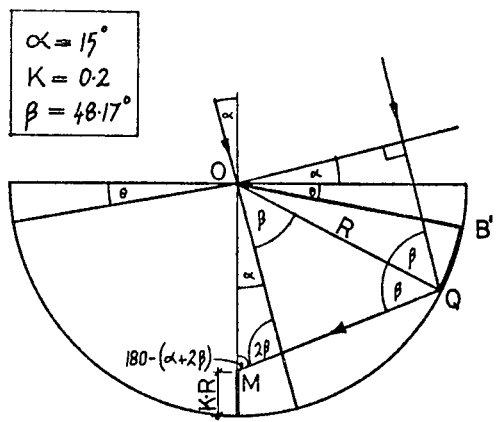
Figure 5:
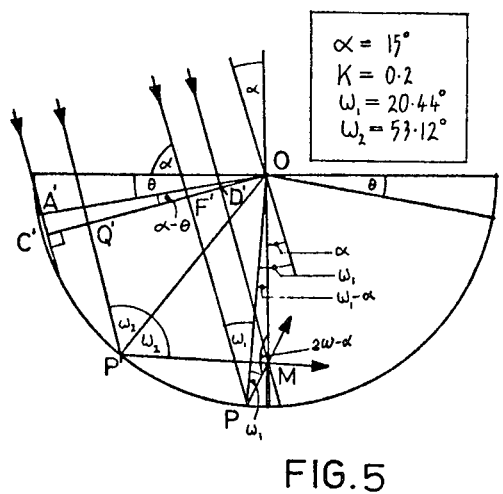
Figure 6:
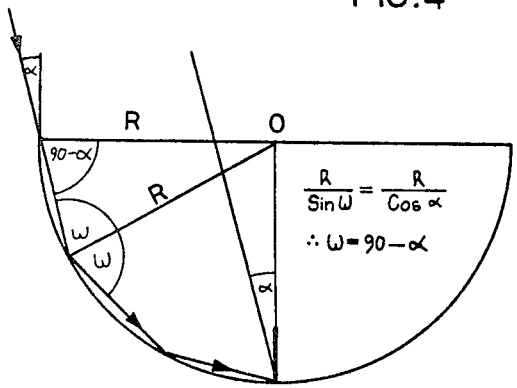

$C.R. = \cos(\alpha - \theta) - (0.5)\sin(\alpha) + \cos(\alpha + \theta) - \sin(\beta)$ The third and last step will be to calculate the C.R. when all three variables ($\alpha$, $\theta$ and K) varying simultaneously as shown in FIGS. 4, 5 and 6.

From FIG. 4 it can be seen that for $\triangle OQM$ $R/\sin(\alpha + 2\beta) = (1-K) R / \sin(\beta)$ or $\sin(\beta) = (1-K) \sin(\alpha + 2\beta)$ (i)

and for $\alpha = 0$; $\beta = \arccos[\tfrac{1}{2}(1-K)]$

The trivial solution $\beta = 0$ is the solution for K=0.5. The absorbed incoming radiation through $\overline{OB}'$ will be $R \cos(\alpha + \theta) - \sin(\beta)$, but now $\beta$ is a function of K as well. Making use of the concept used to find $\beta$ the E.C.W. (effective concentration width) through $\overline{OA}'$ (FIG. 5) will be a function of $\omega$ [$\triangle OPM$ and $OP'M$] and $\alpha \leq \omega < 90 - \alpha$ (see FIG. 6).

$\omega$ is the solution (if there is one) to the equation $R / \sin(2\omega - \alpha) = (1 - K) R / \sin(\omega)$ rearranging $\sin(\omega) = (1-K) \sin(2\omega - \alpha)$ (ii)

and for $\alpha = 0$; $\omega = \arccos(\tfrac{1}{2}(1-K))$.

The trivial solution $\omega = 0$ is the solution for k =0.5.

When trying to solve equation (ii) we find that except for the trivial solution there are three other possibilities.
1. No solution (usually for large L and large $\alpha$).
2. One solution 3. Two different solutions.

For the first and second cases the E.C.W. (effective concentration width) through $\overline{OA}'$ is $\overline{C'D'}$ or $R \cos(\alpha - \theta) - (1 - K) \sin(\alpha)$ and the C.R. becomes:

$$C.R. = \dfrac{R[\cos(\alpha - \theta) - (1 - K)\sin(\alpha) + \cos(\alpha + \theta) - \sin(\beta)]}{2(KR)} \quad (4)$$

This equation does not hold for $\alpha = 0$.

For the third case (two solutions) the E.C.W. will be:

$\overline{DF} + \overline{QC} = [\overline{OC} - \overline{OQ}] + [\overline{OF} - \overline{OD}']$ (FIG. 5)

that is, $R \cos(\alpha - \theta) - R \sin(\omega_2) + R \sin R (\omega_1) - (1 - K) R \sin(\alpha)$.

Therefore:

$$C.R. = \dfrac{\cos(\alpha - \theta) - \sin(\omega_2) + \sin(\omega_1) - (1 - K)\sin(\alpha) + \cos(\alpha + \theta) - \sin(\beta)}{2K} \quad (5)$$

Equation (5) is a general formula that can be used for all possible situations, however, changes are needed in the following cases:
1. When $\alpha = 0$ and K=0.5; put $\omega_1 = \omega_2 = \beta = 0$.
2. When $\alpha = 0$ and $0.1 \leq K < 0.5$; put $\omega_1 = 0$ and $\omega_2 = \beta$.
3. 
   (a) When $0 < \alpha \leq 30$ and $0.1 \leq K < 0.5$ and there is one or no solution to equ. (ii); put $\omega_1 = \omega_2 = 0$.
   (b) Two solutions for $\omega$ (equ. (ii)), then use equation (5) when $\omega_2$ is always the greater value.

When testing equation (ii) in the region $\overline{Q'C'}$ by inserting $\omega > \omega_2$ we may get K<0 for the equation $K = 1 - [\sin(\omega) / \sin(2\omega - \alpha)]$ which is another rearrangement of equ. (ii).

The physical meaning of this is that the reflected ray "sees" the mirror as a transparent object and causes point M (FIG. 5) to move in the negative direction of the Y axis, but actualy the ray is re-reflected and finally absorbed by the receiver.

FIG. 7 illustrates how the concentration ratio varies with the angle $\alpha$ (angle between the sun's rays and the normal to the surface) with different values of K (absorber radius ratio, i.e. K=L/R, FIG. 1 above). Thus, when K=0.1, the concentration ratio is high at very small angles $\alpha$, and then drops rapidly when the angle exceeds about 15°; when K =0.2, the concentration ratio is the highest when $\alpha$=about 28°; when K =0.3, the concentration ratio is the highest when $\alpha$=about 16°; when K =0.4, the concentration ratio is highest when $\alpha$=about 6°; and when K =0.5, the concentration ratio is highest when $\alpha$=0°, i.e. when the solar radiations are exactly normal to the axis of the collector. It will thus be seen that the highest concentration ratio is attainable when K =0.5, and the solar radiations impinge the collector exactly at right angles to the collector axis, i.e. paraxially with respect to the collector.

FIG. 8 is a transverse sectional view illustrating a focussing solar collector constructed in accordance with the foregoing considerations wherein K =0.5, i.e. wherein the collector has an absorber radius ratio (L/R)=0.5.

The focussing solar collector illustrated in FIG. 8 comprises a mirror 2 of cylindrical configuration having a semi-circular cross-section. Thus, the axis of the reflector is indicated by line "A", which line intersects the center-of-curvature "C" and the mid-point "M" of the reflector.

Disposed within the reflector 2 is a flattened tube or conduit 4 through which is to be conducted the heat-transfer medium (e.g. water, other liquid, or gas) to be heated by the solar radiations impinging the collector. Tube 4 is preferably made of a metal tube circular in cross-section which metal tube has been flattened to form two long sides which are substantially flat and joined with rounded ends. Thus, the height of tube 4 is substantially less than its width. In this example, the radius of the reflector is indicated as "R"; the height of tube 4 is preferably "R/2", and its width is preferably "R/6", thereby providing a height-width ratio of 3:1. Further, as shown in FIG. 8, absorber tube 4 is disposed within the reflector with one end of the tube at the mid-point "M" of the reflector inner surface, and with the height axis of the absorber tube 4 aligned with the reflector axis "A", namely the line drawn from the mid-point "M" through the center of curvature "C" of the reflector.

It will thus be seen that a focussing solar collector constructed as illustrated in FIG. 8, wherein K =0.5, provides a maximum concentration ratio of 2.0 when the solar radiations are exactly parallel with the solar collector axis A. That is to say, the above relationship applies when the flattened pipe 4 is treated as a very thin plate. Preferably, the height-width ratio of tube 4 should be in the range of 2.5:1 to 3.5:1 to provide the maximum concentration ratio for this configuration.

FIGS. 9 and 10 illustrate a solar collector including a plurality of reflectors and absorber tubes each as described above with respect to FIG. 8. Thus, the solar collector illustrated in FIGS. 9 and 10 includes a housing 20 in which are disposed four reflectors 22 in parallel side-by-side relationship, each reflector being of cylinder configuration having a semi-circular cross-section, as reflector 2 in FIG. 8. The absorbers 24 are also of flattened tubes of the same construction, and are disposed within their reflector 22 in the same manner, as flattened tube 4 in FIG. 8. All the flattened tubes are connected together by a common inlet header 26 at one end, and by a common outlet header 28 at the opposite end. Housing 20 may be made of galvanized sheet metal, for example, and is closed at its upper end by a transparent, (e.g., glass) cover 30 secured thereto by a peripheral flange 32 of extruded aluminum, for example. The bottom of the housing is covered with insulation 34 (e.g., mineral wool), and supports 36 (e.g., wood) are provided for the reflectors 22.

It will be appreciated that the constructions illustrated in FIGS. 8–10 are provided for purposes of example only, and that many variations, and other applications of the invention may be made. For example, the flattened tube could be a single continuous tube of serpentine shape.

What is claimed is:

1. A focussing solar collector including a solar-radiation reflector and a solar-radiation absorber disposed to receive the solar-radiations directly and those reflected from the reflector, characterized in that said reflector is of a cylindrical configuration having a semi-circular cross-section and a constant radius of curvature, and that said absorber is of flattened cross-section having a height of no less than 0.1, but no more than 0.5 times the radius of curvature of the reflector and a width substantially less than its height, said absorber being disposed within the reflector with one end of the absorber at the mid-point of the reflector inner surface and with the height axis of the absorber aligned with the reflector radius from said mid-point.

2. a solar collector according to claim 1, wherein said absorber is a flattened pipe for conducting therethrough a heat-transfer fluid medium to be heated by the solar radiations, said flattened pipe having a height:width ratio in the range of 2.5:1 to 3.5:1.

3. A solar collector according to claim 2, wherein said flattened pipe is formed with a pair of planar side walls joined at their ends by concave, semi cylindrical end walls.

4. A solar collector according to any one of claims 1–3 wherein said absorber has a height equal to 0.5 times the radius of curvature of the reflector.

* * * * *